(12) United States Patent
Goel et al.

(10) Patent No.: US 7,996,522 B2
(45) Date of Patent: Aug. 9, 2011

(54) PERSISTENT SCHEDULING TECHNIQUES

(75) Inventors: Shaily Goel, Bangalore (IN); Anand Sinha, Bangalore (IN)

(73) Assignee: Novell, Inc., Provo, UT (US)

( * ) Notice: Subject to any disclaimer, the term of this patent is extended or adjusted under 35 U.S.C. 154(b) by 289 days.

(21) Appl. No.: 11/949,881

(22) Filed: Dec. 4, 2007

(65) Prior Publication Data
US 2009/0144739 A1 Jun. 4, 2009

(51) Int. Cl.
G06F 15/173 (2006.01)
G06F 15/16 (2006.01)

(52) U.S. Cl. ........................................ 709/224; 709/206

(58) Field of Classification Search .................. 709/224, 709/223, 206
See application file for complete search history.

(56) References Cited

U.S. PATENT DOCUMENTS

| | | | |
|---|---|---|---|
| 6,421,676 B1 | 7/2002 | Krishnamurty | |
| 6,542,984 B1 | 4/2003 | Keller et al. | |
| 2003/0120578 A1* | 6/2003 | Newman | 705/36 |
| 2003/0204430 A1* | 10/2003 | Kalmick et al. | 705/8 |
| 2004/0059808 A1* | 3/2004 | Galloway et al. | 709/224 |
| 2005/0060720 A1* | 3/2005 | Mayer | 719/318 |
| 2005/0187991 A1* | 8/2005 | Wilms et al. | 707/204 |
| 2006/0056340 A1 | 3/2006 | Hottinen et al. | |
| 2006/0173723 A1 | 8/2006 | Fisher | |
| 2006/0178921 A1* | 8/2006 | Chuang et al. | 705/8 |
| 2006/0203620 A1* | 9/2006 | Bedingfield | 368/247 |
| 2006/0206881 A1 | 9/2006 | Dodge et al. | |
| 2007/0055688 A1* | 3/2007 | Blattner | 707/102 |
| 2007/0073693 A1 | 3/2007 | Harris et al. | |
| 2007/0089071 A1* | 4/2007 | Zinn et al. | 715/844 |
| 2007/0143761 A1 | 6/2007 | Deng | |
| 2008/0114809 A1* | 5/2008 | MacBeth et al. | 707/104.1 |
| 2008/0189202 A1* | 8/2008 | Zadoorian et al. | 705/37 |

OTHER PUBLICATIONS

"Microsoft Developer Network Library, "Task Scheduler (Windows)"", http://msdn2.microsoft.com/en-us/library/aa383614.aspx, 1 pg.

* cited by examiner

Primary Examiner — Hieu Hoang
(74) Attorney, Agent, or Firm — Schwegman, Lundberg & Woessner, P.A.

(57) ABSTRACT

Techniques for persistent scheduling are provided. A principal registers a schedule with a network-based scheduling service. The scheduling service determines when a trigger is to be sent to a client associated with the principal for purposes of having that client process a particular action. The trigger is sent when the client is detected as being online; and when the client is offline, the trigger is sent as soon as the client comes online. Furthermore, once a trigger is successfully sent, a current date and time that the trigger was sent is maintained with the schedule for the client.

4 Claims, 4 Drawing Sheets

PERSISTENT SCHEDULING TECHNIQUES

BACKGROUND

There is a variety of reasons why users or administrators may want to schedule certain application programs to process at defined dates, times, intervals, or even on certain defined events. A good example is when a user boots up his/her computer after it had been powered off. In this example, the boot file is executed upon detecting the event identifying the machine as being powered on. A variety of user services may then be initialized and started, such as network services, directory services, virus scan services, etc.

Of course there are other more complex situations, where an administrator or user wants a particular program to run only on certain days of the month, such as a software audit or a full system virus scan.

The problem with these more complex scheduling situations is that the scheduling dates/events do not persist. In other words, say the software audit is to run on the first of each month. If the computer is powered off on the first and not powered on until the second of the month (such as may be the case for the month of January, where the first is a holiday for most employees), then the software audit is not run until the first of the next month. Again, if an employee is out sick, at a seminar, or out on vacation for that next month, then it will be three months before the needed software audit processes, assuming the employee is there on the first of that third month.

In other cases, because the scheduling logic does not persist, if a scheduled date passes and is not processed, the program that was to execute may in fact execute on every re-boot of the computer. So, in our prior example the software audit may process on the second of January and for each day in January or until the first of the month comes and it runs properly. Obviously, this scenario is very problematic for a user since it degrades performance of the computer and the scenario is also problematic for a network administrator because the audit is likely sent via a network connection and it will unduly tie up network bandwidth.

Consequently, there is a need for improved scheduling techniques.

SUMMARY

In various embodiments, techniques for persistent scheduling are provided. In an embodiment, a method for persistent scheduling is provided. More specifically, a determination is made that a client has re-connected to a network connection. Next, a schedule associated with the client is inspected and a past due action item is detected for the client within the schedule. A trigger is sent to the client to process an action defined in the schedule and the schedule is updated to indicate a current date and time that the trigger was successfully sent to the client.

DETAILED DESCRIPTION

Figure 1:
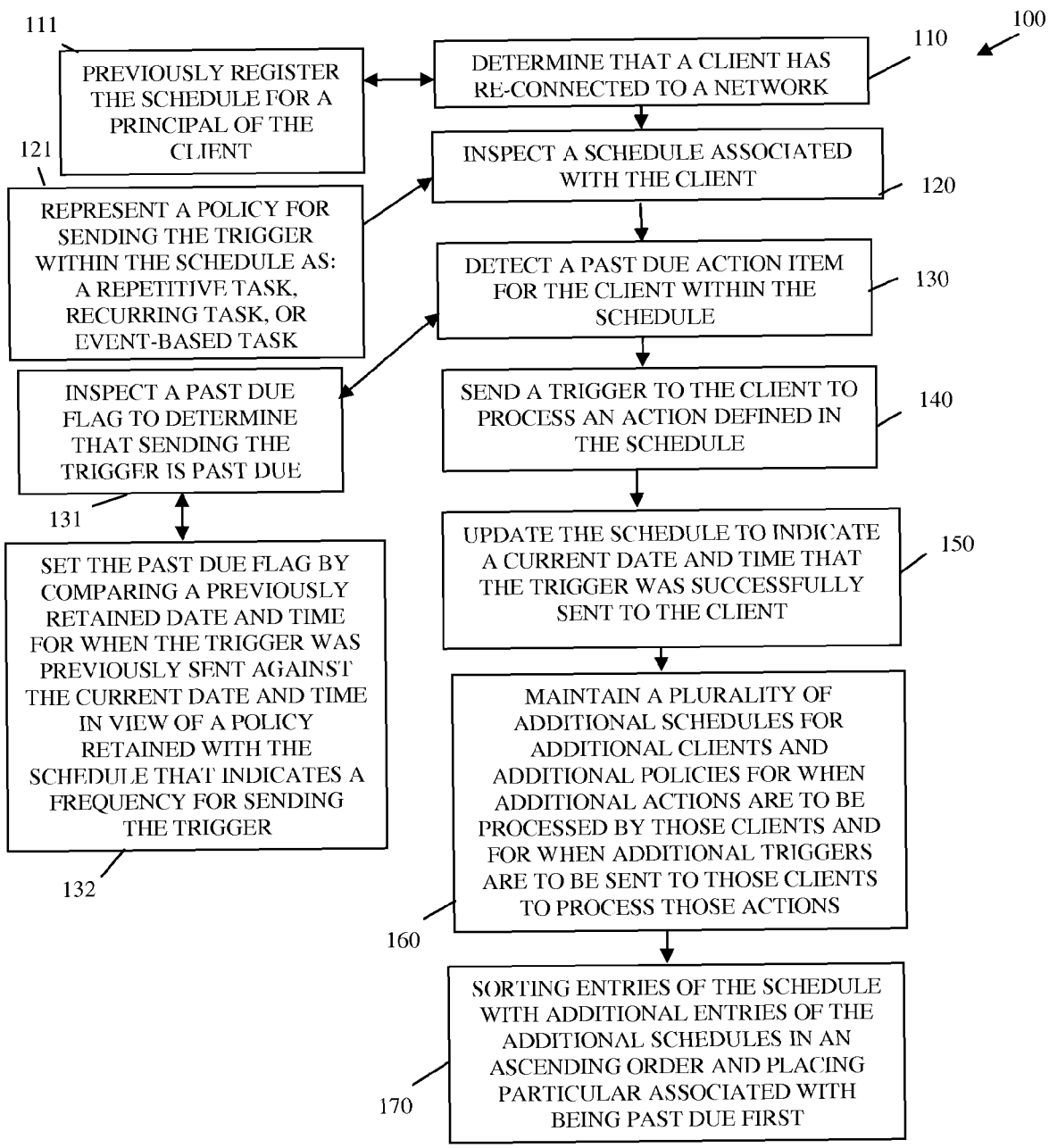
FIG. 1 is a diagram of a method for persistent scheduling, according to an example embodiment.

A "resource" includes a user, content, a processing device, a node, a service, an application, a system, a gateway, a directory, a data store, a World-Wide Web (WWW) site, an end-user, groups of users, combinations of these things, etc. The terms "service," "module," and "application" may be used interchangeably herein and refer to a type of software resource that includes instructions, which when executed by a machine performs operations that change the state of the machine and that may produce output. Additionally, a "principal" is a type of resource that actively interacts with other resources. So, a principal may be a user or an automated service.

A "client" is an environment having one or more machines (processing devices, such as but not limited to a computer) that is enabled over a network and that includes resources and in some cases processes the resources. A "server" is also an environment having one or more machines that is enabled over a network and that includes resources and in some cases processes the resources. The terms "client" and "server" when used in combination define a client-server architecture, where the client and server are remote from one another over a network connection, such as a wide-area network (WAN) and insecure public communications network such as the Internet. Both a client and a server may be viewed as types of resources similar to what was described above with reference to the principal.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) may collectively be viewed as a processing environment. The processing environment also refers to software configurations of the physical processing devices, such as but not limited to operating system, file system, directory service, etc.

Various embodiments of this invention can be implemented in existing network architectures, proxies, security systems, data centers, directory systems, and/or communication devices. For example, in some embodiments, the techniques presented herein are implemented in whole or in part in the Novell® network, proxy server products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1 is a diagram of a method 100 for persistent scheduling, according to an example embodiment. The method 100 (hereinafter "persistent scheduling service") is implemented as instructions in a machine-accessible and readable medium. The instructions when executed by a machine (computer or processing device) perform the processing depicted in FIG. 1. The persistent scheduling service is also operational over and processes within a network. The network may be wired, wireless, or a combination of wired and wireless.

The persistent scheduling service processes over the network on a server and services a plurality of client machines associated with principals (e.g., users or automated services). Some client machines may be laptops that can connect to the network from remote locations, such as when the network is the Internet. Secure communications may also be used, such as a virtual private network (VPN). In other cases, the clients may be part of a local area network (LAN) within an enterprise. Of course some of the client may connect via a wide area network (WAN; such as the Internet) while others of the client connect via a LAN. So, there can be a plurality of different manners in which the clients connect to the persistent scheduling service over the network.

At 110, the persistent scheduling service determines that a client, which was offline, has now connected to the persistent scheduling service over the network. The client may have been powered off or offline for a variety of reasons.

According to an embodiment, at 111, the persistent scheduling service had previously registered a schedule for a principal associated with the client. The schedule conforms to a schedule schema that includes a variety of elements and attributes. Each entry of the schedule can include a variety of information, such as but not limited to an identifier for the client and principal; a particular action that the client is to receive notifications or triggers for; a policy defining when the client is to receive the triggers; a resource identifier that identifies an action (program, application, service, etc.) that the client is to process when it receives the triggers; a past due flag (discussed below), a last date and time that the triggers were sent to the client; etc.

At 120, the persistent scheduling service inspects a schedule associated with the client after detecting that the client is now online.

In an embodiment, the persistent scheduling service may represent or recognize a policy within the schedule of the client as being associated with any of the following: a repetitive task (e.g., interval based schedule, one time schedule, etc.); a recurrence task (e.g., daily schedules, monthly schedules, weekly schedules, quarterly schedules, semi annual schedules, annual schedules, etc.); and an event-based task (e.g., when user/principal logs into the network, screen saver comes off event, system start event, system off event, custom service-based event, etc.).

At 130, the persistent scheduling service detects a past due action item for the client within the schedule. This can be done in a variety of manners.

For example, at 131, the persistent scheduling service can maintain and then inspect a past due flag maintained with the schedule of the client to determine that sending the trigger to the client is in fact past due.

At 132, the persistent scheduling service sets the past due flag by comparing a previously retained date and item for when the trigger was previously sent against the current date and time in view of a policy also retained with the schedule. This indicates a frequency for sending the trigger has occurred and the trigger is to be sent but because the client was offline when the trigger was to be sent, the trigger was never in fact sent to the client. The past due flag is then set under these circumstances and this allows the persistent scheduling service to rapidly determine when the client is back online and reconnected that the trigger has to be sent to the client for the client to process the action defined in the schedule.

In another case, no flag is needed at all because the persistent scheduling service regularly evaluates the policy (conditions or criteria) that indicate a trigger is to be sent to the client. In this case, information is retained to indicate when the trigger was sent, such as current date and time when the trigger was sent, so that the persistent scheduling service can persist when and how frequently the trigger is sent. This is done to ensure the trigger is sent once and only when due to the client.

It is noted that event with the past due flag approach, the policies are evaluated to determine when the trigger is sent and the current date and time when the trigger is sent is maintained as well with the schedule to ensure persistence of the schedule and when triggers are sent.

At 140, the persistent scheduling service sends a trigger to the client to process an action (resource) defined in the client's schedule. This is done in response to the past due action item being detected in the schedule and in response to the fact that the client is now re-connected to the network and can properly receive the trigger.

At 150, the persistent scheduling service updates the schedule to indicate a current date and time that the trigger was successfully sent to the client. This information ensures that the persistent scheduling service does not resend the trigger until it is again appropriate to do so according to policy defined in the schedule. Although, it is noted it may never occur again if the trigger was a one time occurrence as defined in the schedule.

According to an embodiment, at 160, the persistent scheduling service maintains a plurality of additional schedules for additional clients and additional policies for when additional actions are to be processed by those clients. This is done via sending additional triggers to those additional clients to process the additional actions.

So, the persistent scheduling service can service a plurality of clients over the network, and the processing depicted at 110-150 is provided for purposes of illustration and ease of comprehension and is not intended to limit the persistent scheduling service to a single client and its schedule persistence management.

In another situation, at 170, the persistent scheduling service sorts entries associated with the client's schedule with additional entries for the additional schedules associated with the additional clients. The sorting is done in a date-based ascending order and each past due entry is listed first in the sorted list. This permits the persistent scheduling service to achieve more efficient management when multiple client schedules are being persisted by the persistent scheduling service.

A few example illustrations now describe how the persistent scheduling service may process on behalf of a client in particular circumstances.

In a first example, a schedule for a client is added on Monday at 6:00 a.m. A policy for the schedule indicates that a trigger to send an inventory of programs on the client to a server service (such as an administrator) every Monday at 8:00 a.m. However, the client is powered off at 7:00 a.m. on Monday and then powered back on at 9:00 a.m. on that same Monday. In a conventional situation, the client would not receive a notification because it was off at 8:00 a.m.; thus, the next time that client would receive the trigger would be the next time the client is actually powered on the network on a Monday at 8:00 a.m. However, the persistent scheduling service can handle this situation and immediately detect the past due action item for the client and send the trigger as soon as the client powers onto the network at 9:00 a.m. that Monday. Assume further that the client powers down at 9:30 a.m. and then re-powers up at 10:00 a.m. In this case, the persistent scheduling service knows that it sent the trigger to the client to send the inventory at 9:00 a.m. because the persistent scheduling service recorded the time it sent the trigger; thus, no further trigger is sent.

In another example, suppose the client's policy in the schedule calls for sending a trigger to send the inventory to the server service on the third day of every month at 6:00 a.m. Suppose further that the current month is January and a user associated with the client is on vacation and he/she powered off the client and took it with him/her at 4:00 a.m. on January 2. The client is not powered back on until January 5. When January $3^{rd}$ occurred at 6:00 a.m., the persistent scheduling service detected that the trigger was to be sent to the client but it could not send the trigger because the client was offline. In response, the persistent scheduling service sets a past due flag to true for the schedule of the client, such that when the client re-connects on the $5^{th}$ of January, the persistent scheduling service immediately sends the trigger. That is the only trigger sent by the persistent scheduling service for the entire month of January because the persistent scheduling service records and knows a successful trigger did occur for January albeit on January $5^{th}$.

The persistent scheduling service persists the last triggered time for which a trigger was sent to the client. It persists this by recording the date and time that a trigger was successfully sent to the client and each time a new trigger is to be sent according to policy, a new date and time is overwritten for the schedule.

Moreover, at the time of schedule registration (discussed more completely below with reference to the FIG. 2), the persistent scheduling service immediately calculates (or evaluates policy) as to when a next trigger time for the schedule is to be sent with respect to the then current date and time. This can be done via the past due flag. So, if the past due flag is set to true, the persistent scheduling service also calculates the next trigger time of the schedule with respect to the last trigger time that is maintained with the schedule. By maintaining the last trigger time, the persistent scheduling service does not have tack schedule times of every schedule time registered to it; rather the persistent scheduling service just persists the last time that is successfully sent a trigger for any particular schedule. This reduces Input/Output (I/O) operations and increases the efficiency and performance of the persistent scheduling service.

Consider still another illustration with respect to Novell, Inc. of Provo, Utah's ZENwork's® product offering. Here, an administrator configures a schedule for sending client software resource inventories for each client of the network. According to the schedule defined by the administrator all clients should send hardware/software inventories on the first of every month between 8:00 a.m. and 4:00 p.m. On January 1 a few clients are powered off. So, no inventories are sent. On January $5^{th}$ these clients are powered on. As soon as these clients are powered on, the inventory from these machines are sent on January $5^{th}$ and so the administrator will have all the needed inventories within the month of January albeit a few are in fact late. This is because on January $5^{th}$ when the clients are powered on the persistent scheduling service immediately sends those clients their triggers to send the inventories. Suppose further that on January $10^{th}$, a few of the clients that sent late inventories are again powered off (perhaps for maintenance or perhaps a principal (user) undocked them and left the office for a trip of sorts). On January $12^{th}$, the clients are powered on again. Since, the persistent scheduling service retained the last trigger time as January $5^{th}$, these clients will not receive a duplicate trigger to send the inventories on January $12^{th}$.

Figure 2:
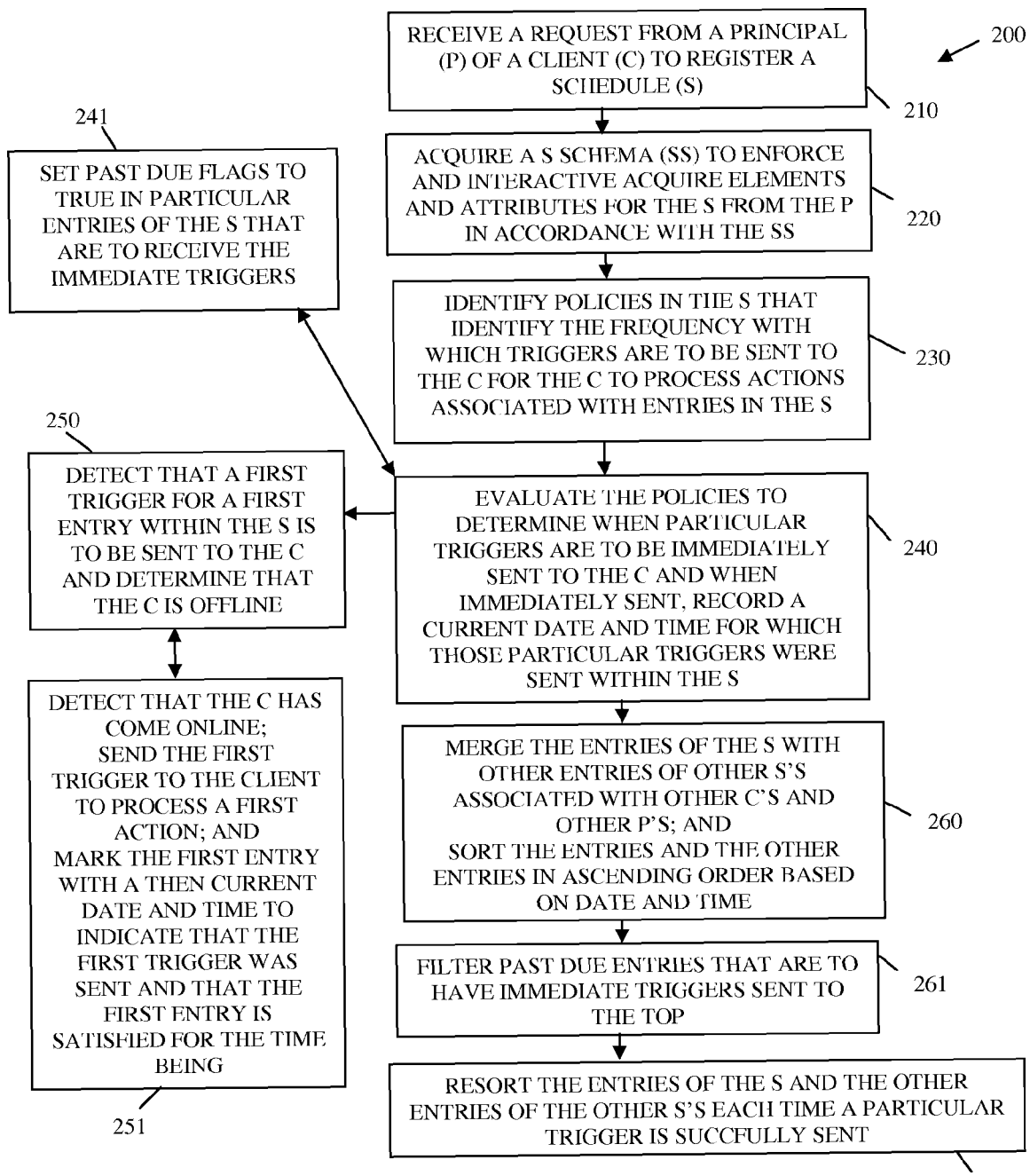
FIG. 2 is a diagram of another method for persistent scheduling, according to an example embodiment.

FIG. 2 is a diagram of another method 200 for persistent scheduling, according to an example embodiment. The method 200 (hereinafter "network scheduling service") is implemented in a machine-accessible and readable medium as instructions. The instructions when executed by a machine perform the processing depicted in the FIG. 2. Moreover, the network scheduling service is operational over a network, and the network may be wired, wireless, or a combination of wired and wireless.

In an embodiment, the network scheduling service is an enhanced perspective depicting other features of the persistent scheduling service discussed in detail above with reference to the method 100 of the FIG. 1.

At 210, the network scheduling service receives a request from a principal of a client to register a schedule. It is noted that the principal may be an administrator and the schedule may be for a plurality of clients, such as was described above with respect to the ZENwork's® illustration. So, the client as discussed herein with reference to the FIG. 2 can be a logical grouping of a plurality of machines associated with a network.

At 220, the network scheduling service acquires a schedule schema to enforce against the principal as the principal interactively provides elements and attributes for the schedule being registered (received by the network scheduling service at 210). The element and attribute values supplied by the principal conform to the schedule schema definition. It is noted that in some instances, the principal can export a schedule in total and in such a case the network scheduling service ensures that each entry in the schedule conforms to the schedule schema.

At 230, the network scheduling service identifies policies (criteria or conditions) within the schedule that identify the frequency with which triggers are to be sent to the client for the client to process an action, which are associated or defined within the schedule entries.

At 240, the network scheduling service evaluates the policies to determine when particular triggers are to be immediately sent to the client. Furthermore, when triggers are immediately sent to the client, the network scheduling service records a current date and time for which those particular triggers were sent within the schedule or metadata associated with the schedule or schedule entries.

One mechanism for doing this, at 241, is for the network scheduling service to set past due flags to have true values within particular entries of the schedule. This identifies those entries that are to have immediate triggers sent when the network scheduling service determines that it can send the triggers, such as when the client is back online.

According to an embodiment, at 250, the network scheduling service detects that a first trigger for a first entry of the schedule is to be sent to the client but the network scheduling service determines the client is unreachable (offline). At some later point in time, at 251, the network scheduling service detects that the client has come back online. In response to this, the network scheduling service immediately sends the first trigger to the client for purposes of having the client process a first action. Next, the network scheduling service marks the first entry with a then current date and time to indicate that the first trigger was successfully sent and that at least for now, the first entry is satisfied.

In another case, at 260, the network scheduling service merges the entries of the registered schedule with other entries of other registered schedules, which are associated with other clients and perhaps other principals. The entries and other entries are then sorted by the network scheduling service in ascending order based on date and time.

At 261, the network scheduling service filters all past due entries that are to have immediate triggers sent to the top of the sorted list. At 262, the network scheduling service again resorts the entries and other entries each time a particular trigger is successfully sent (meaning the clients associated with the triggers were reachable to receive the triggers).

Figure 3:
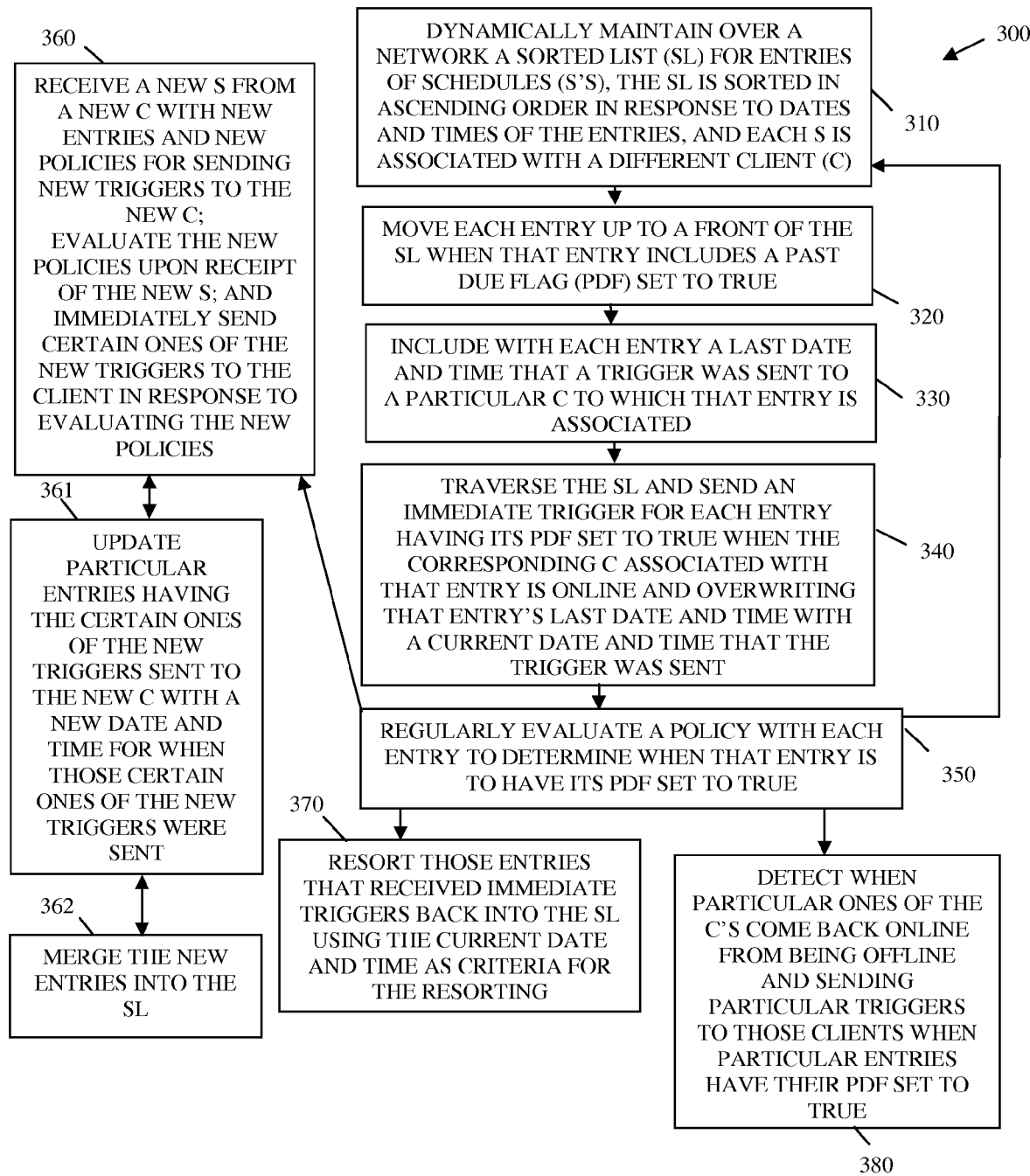
FIG. 3 is a diagram of yet another method for persistent scheduling, according to an example embodiment.

FIG. 3 is a diagram of yet another method 300 for persistent scheduling, according to an example embodiment. The method 300 (hereinafter "scheduling service") is implemented in a machine-accessible and readable medium as instructions. The instructions when executed by a machine perform the processing depicted in the FIG. 3. Moreover, the scheduling service is operational over a network, and the network may be wired, wireless, or a combination of wired and wireless.

The scheduling service represents yet another alternative and in some cases enhanced perspective associated with both the persistent scheduling service represented by the method 100 of the FIG. 1 and the network scheduling service represented by the method 200 of the FIG. 2.

At 310, the scheduling service dynamically maintains over the network a sorted list for entries of schedules. The sorted list is sorted in ascending order in response to dates and times of the entries. Each schedule is associated with a different client. Although it is noted that for some embodiments of the invention, a single client may be logically defined so as to include multiple groupings of clients.

At 320, the scheduling service moves each entry up to a front of the sorted list when that entry includes a past due flag, which is set to true.

At 330, the scheduling service includes with each entry a last date and time that a trigger was successfully sent to a particular client to which that entry is associated. This permits efficiency of management for the scheduling service and persists the schedule entry.

At 340, the scheduling service traverses the sorted list and sends an immediate trigger for each entry that has its past due flag set to true and when the corresponding client associated with that entry is online and available to receive the trigger. Moreover, the scheduling service overwrites that particular entry's last date and time with a current date and time. The current date and time representing the date and time for which the trigger was successfully sent to the client.

At 350, the scheduling service regularly evaluates a policy associated with each entry of the sorted list to determine when it is appropriate to set that entry's past due flag to true. This indicates that the client is to receive a trigger. The processing of the scheduling service reflected in the FIG. 2 is iterative, so once the past due flag is set to true processing continues back at 310 and the processing at 340 is reached where the trigger is sent.

According to an embodiment, at 360, the scheduling service receives a new schedule from a new client with new schedule entries and new policies for sending new triggers to the new client. Next, the scheduling service evaluates the new policies upon receive of the new schedule and immediately sends certain ones of the new triggers to the client in response to evaluating the new policies.

Continuing with the embodiment at 360, and at 361, the scheduling service updates particular entries, which have the certain ones of the new triggers sent to the new client with a new date and time for when those certain ones of the new triggers were sent. At 362, the updated entries and the entries of the new schedule that were received for the new client are merged into the sorted list with the other existing entries.

In an embodiment, at 370, the scheduling service resorts those entries that received immediate triggers back into the sorted list using the current date and time as criteria for the resorting. So, the list is continuously being updated and resorted as needed based on change circumstances, such as triggers being successfully sent to the proper clients.

In still another case, at 380, the scheduling service detects when particular ones of the clients come back online after having been offline for some period of time. Here, the scheduling service immediately sends particular triggers to these clients when particular entries for the schedules of these clients have their past due flags set to true. This occurs just once, so once a trigger is successfully sent it is not re-sent again until the policy indicates that another trigger is to be sent.

Figure 4:
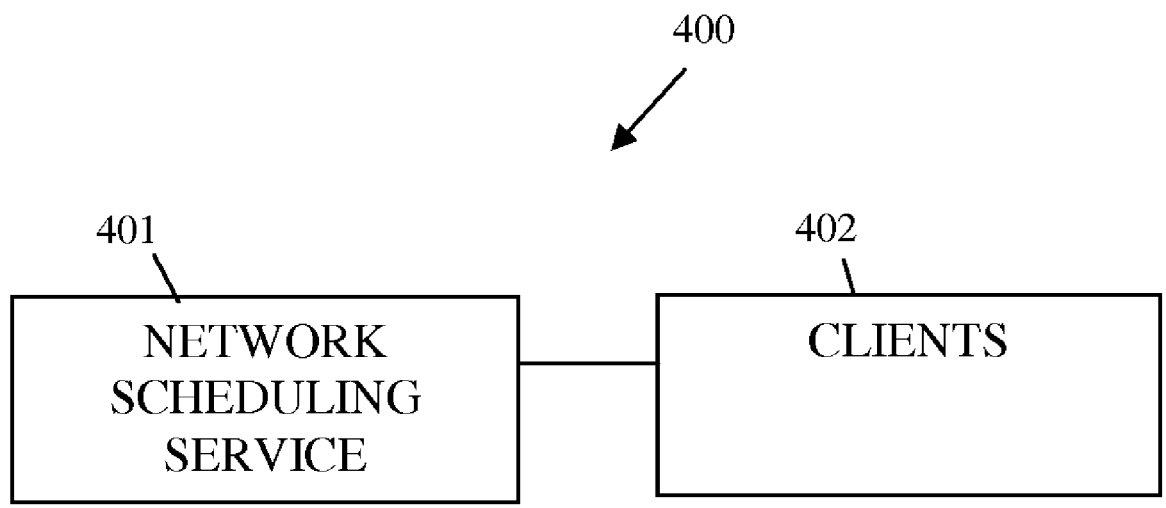
FIG. 4 is a diagram of a persistent scheduler system, according to an example embodiment.

FIG. 4 is a diagram of a persistent scheduler system 400, according to an example embodiment. The persistent scheduler system 400 is implemented as instructions on or within a machine-accessible and readable medium. The instructions when executed by one or more machines perform, among other things, processing depicted with respect to the methods 100, 200, and 300 of the FIGS. 1-3, respectively. The persistent scheduler system 400 is also operational over a network, and the network may be wired, wireless, or a combination of wired and wireless.

The persistent scheduler system 400 includes a network scheduling service 401 and a plurality of clients 402. Each of these and their interactions with one another will now be discussed in turn.

The network scheduling service 401 is implemented in a machine-accessible and computer-readable medium and is to process on a server machine. Example processing associated with the network scheduling service 401 was presented in detail above with reference to the FIGS. 1-3.

The network scheduling service 401 permits principals associated with clients to register schedules over the network. Each schedule includes one or more entries and each entry includes a policy that defines when that particular client is to receive a trigger for performing an action on that particular client. Furthermore, the network scheduling service 401 dynamically tracks when the clients are online and when they are offline. The network scheduling service 401 also ensures that particular triggers are sent when dictated by particular policies and when overdue and further when those particular clients are in fact online. Various techniques for achieving this were discussed in detail above with reference to the FIGS. 1-3.

In an embodiment, the network scheduling service 401 includes with each entry a past due flag that is initially set to false and that is updated to true when it is appropriate to send a trigger in accordance with policy. Further, the network scheduling service 401 uses the past due flag of each entry to determine when the trigger is in fact overdue.

In another scenario, the network scheduling service 401 merges and sorts entries of each of the schedules into a list in ascending order in response to date and time that particular triggers are to be sent to the clients.

In yet another situation, the network scheduling service 401 updates certain entries for a certain client and certain schedule when a certain trigger is sent to the client. The entry in question is updated with a current date and time for when that trigger was sent to the client.

The clients 402 represent machines (computing devices, processing devices, etc.) on the network that are interfaced to the server machine and that are each associated with a particular principal. Again, any particular client 402 can be a logically defined grouping of clients. This permits an administrator (principal) to define schedules and entries within schedules for a plurality of clients using a single client reference for a single schedule.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method for executing on a processing device, comprising:
   determining, by the processing device, that a client has re-connected to a network;
   inspecting, by the processing device, a schedule associated with the client, each entry of the schedule includes: an identifier for the client, a particular task that the client is to receive notifications for, a policy defining when the client is to receive the notifications, a resource identifier that identifies an action that the client is to process when it receives the notifications, a past due flag indicating a past due action that was past due before the client has re-connected to the network, and a last date and time that a last notification was sent to the client;
   setting, by the processing device, the past due flag by comparing the last date and time that the last notification was sent to the client against a current date and time and in view of the policy retained within the schedule that indicates a frequency for sending the notifications;
   detecting, by the processing device, the past due action for the client within the schedule by inspecting whether the past due flag is set to determine that sending a notification is past due;
   sending, by the processing device, the notification to the client just once to process the action defined in the schedule, the action associated with the past due action, and the notification sent just once in response to both detecting the past due action and determining that the client has re-connected to the network;
   updating, by the processing device, the schedule to indicate the current date and time that the notification is successfully sent to the client; and
   ensuring, by the processing device, based on the updated schedule that the notification is not resent to the client until the policy indicates the notification is to be resent.

2. The method of claim 1, further comprising maintaining, by the processing device, a plurality of additional schedules for additional clients and additional policies for when additional actions are to be processed by the additional clients and for when additional notifications are to be sent to the additional clients to process the additional actions.

3. The method of claim 2, further comprising sorting, by the processing device, entries of the schedule within additional entries of the additional schedules in an ascending order and placing particular entries associated with being past due first.

4. The method of claim 1, wherein the step of determining further comprises previously registering the schedule for a principal of the client.

* * * * *